(12) United States Patent
Brombal

(10) Patent No.: US 8,948,099 B2
(45) Date of Patent: Feb. 3, 2015

(54) GEO-LOCAL ROUTING IN IMS

(75) Inventor: David Brombal, Plano, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 454 days.

(21) Appl. No.: 13/010,015

(22) Filed: Jan. 20, 2011

(65) Prior Publication Data

US 2012/0188948 A1    Jul. 26, 2012

(51) Int. Cl.
*H04W 4/00* (2009.01)
*H04W 4/02* (2009.01)
*H04W 4/20* (2009.01)

(52) U.S. Cl.
CPC ............... *H04W 4/02* (2013.01); *H04W 4/021* (2013.01); *H04W 4/20* (2013.01)
USPC ........................................................ 370/329

(58) Field of Classification Search
USPC ........................................................ 370/329
See application file for complete search history.

(56) References Cited

U.S. PATENT DOCUMENTS

| 2004/0068574 | A1* | 4/2004 | Costa Requena et al. | .... 709/230 |
| 2007/0124438 | A1* | 5/2007 | Park et al. | ...................... 709/223 |
| 2008/0298353 | A1* | 12/2008 | Zhu et al. | ....................... 370/356 |
| 2011/0093592 | A1* | 4/2011 | Kubinszky et al. | ........... 709/224 |

FOREIGN PATENT DOCUMENTS

WO    WO 2008/070842 A1    6/2008

* cited by examiner

*Primary Examiner* — Noel Beharry

(57) ABSTRACT

In an IP Multimedia setting, a proxy server of a visited network receives a request for a geo-local service from a roaming user agent. The proxy server modifies the received request and forwards the modified request to the user agent's home network. The modification is such that the modified request or a related request message is routed back to the visited network from the user agent's home network, and the geo-local service requested by the roaming user agent is routed to an appropriate IMS entity in the visited network.

22 Claims, 10 Drawing Sheets

GEO-LOCAL ROUTING IN IMS

TECHNICAL FIELD

Technical field of present disclosure relates to method, apparatus and system for geo-local routing in IP Multimedia System.

BACKGROUND

In an IP Multimedia System (IMS), a geo-local service is a service characterized by an access number that has meaning in the current geographic location of the user. For example, dialing *55 from a mobile terminal (e.g., a cell phone) in Oklahoma will deliver the caller to the closest highway emergency assistance, whereas in Texas *377 must be used. Dialing *55 in Texas would either route to something unexpected, or not be completed at all. There are many possible examples of geo-local services, characterized by numbers such as *pizza, or *taxi.

Conventionally in IMS, services and routing decisions are all handled in the user's home network. One reason this is done is for consistency, so that services such as call forwarding, call transfer, call waiting, etc. work consistently regardless of where the user is roaming. However, when a user roams to another geographic area, the user's home network typically will not understand how to properly route calls made to geo-local numbers in the visited network.

Even if the number is valid, e.g., if *55 also is valid in the user's home state of Nebraska, the home network would need to have a database listing Oklahoma as well as Nebraska highway assistance geographic boundaries and their regular land access numbers to route the call. This can get cumbersome when international travelling, which is an increasingly common occurrence, is considered. Under the existing IMS mechanism, a user from Sweden visiting Oklahoma should not expect his or her home server in Stockholm to know the auto repair facility nearest the user's broken down car.

SUMMARY

A non-limiting aspect of the disclosed subject matter is directed to a method for routing an IP Multimedia Services service request message. In the method, a proxy server of a visited network receives an initial message from a roaming user agent. The initial message is a geo-local service request message that is meaningful within the visited network. The proxy server generates a modified message based on the initial message and forwards the modified request message to a home network of the roaming user agent. The modified message is a session initiation protocol message and may include information apart from the information included in the initial message. Preferably, the modified message includes information to enable the home network of the user agent to route a subsequent message to the visited network, which is a session initiation protocol message related to the modified message. The proxy server receives the subsequent message from the home network of the roaming user agent, and routes an IMS message related to the initial message to an IMS entity of the visited network based on the subsequent message.

Another non-limiting aspect of the disclosed subject matter is directed to another method for routing an IP Multimedia Services service request message. In the method, a proxy server of a visited network receives an initial message from a roaming user agent. The initial message is a geo-local service request message that is meaningful within the visited network. The proxy server generates a modified message based on the initial message and forwards the modified request message to a home network of the roaming user agent. The modified message is a session initiation protocol message, and may include a user part and a host part. The proxy server generates the user part to include a zone indication of a geographical zone served by the proxy server. The proxy server generates the host part to include an entity indication of an entity of the visited network such that the entity indication is resolvable at the home network of the user agent. This enables a subsequent message, which is a session initiation protocol message related to the modified message, to be routed from the home network of the roaming user agent to the entity of the visited network.

Yet another non-limiting aspect of the disclosed subject matter is directed to a proxy server of a visited network arranged to route an IP Multimedia Services service request message. The proxy server includes a communication unit and a message generation unit. The communication unit includes an arrangement to receive an initial message from a roaming user agent. The initial message is a geo-local service request message that is meaningful within the visited network. The message generation unit includes an arrangement to generate a modified message based on the initial message. The modified message is a session initiation protocol message. The communication unit further includes an arrangement to forward the modified message to a home network of the roaming user agent, an arrangement to receive a subsequent message from the home network of the roaming user agent, the subsequent message being a session initiation protocol message and being related to the modified message, and an arrangement to route an IMS message related to the initial message to an IMS entity of the visited network. The message generation unit further includes an arrangement to generate the IMS message related to the initial message directed to the IMS entity based on the subsequent message. The modified message includes information apart from information included in the initial message, and the modified message includes information to enable the home network of the user agent to route the subsequent message to the visited network.

Yet a further non-limiting aspect of the disclosed subject matter is directed to a proxy server of a visited network arranged to route an IP Multimedia Services service request message. The proxy server includes a communication unit and a message generation unit. The communication unit includes an arrangement to receive an initial message from a roaming user agent. The initial message is a geo-local service request message that is meaningful within the visited network. The message generation unit includes an arrangement to generate a modified message based on the initial message. The modified message is a session initiation protocol message. The communication unit further includes an arrangement to forward the modified message to a home network of the roaming user agent. The arrangement of the message generation unit to generate the modified message based on the initial message includes an arrangement to generate a user part of the modified message to include a zone indication of a geographical zone served by the proxy server, and an arrangement to generate a host part of the modified message to include an entity indication of an entity of the visited network resolvable at the home network of the roaming user agent to enable the home network of the roaming user agent to route a subsequent message to the entity of the visited network, the subsequent message being a session initiation protocol message and being related to the modified message.

DESCRIPTION OF THE DRAWINGS

The foregoing and other objects, features, and advantages of the disclosed subject matter will be apparent from the FIG. 1 illustrates an example scenario for geo-local routing for providing geo-local service to a visiting mobile terminal.

DETAILED DESCRIPTION

Figure 1:
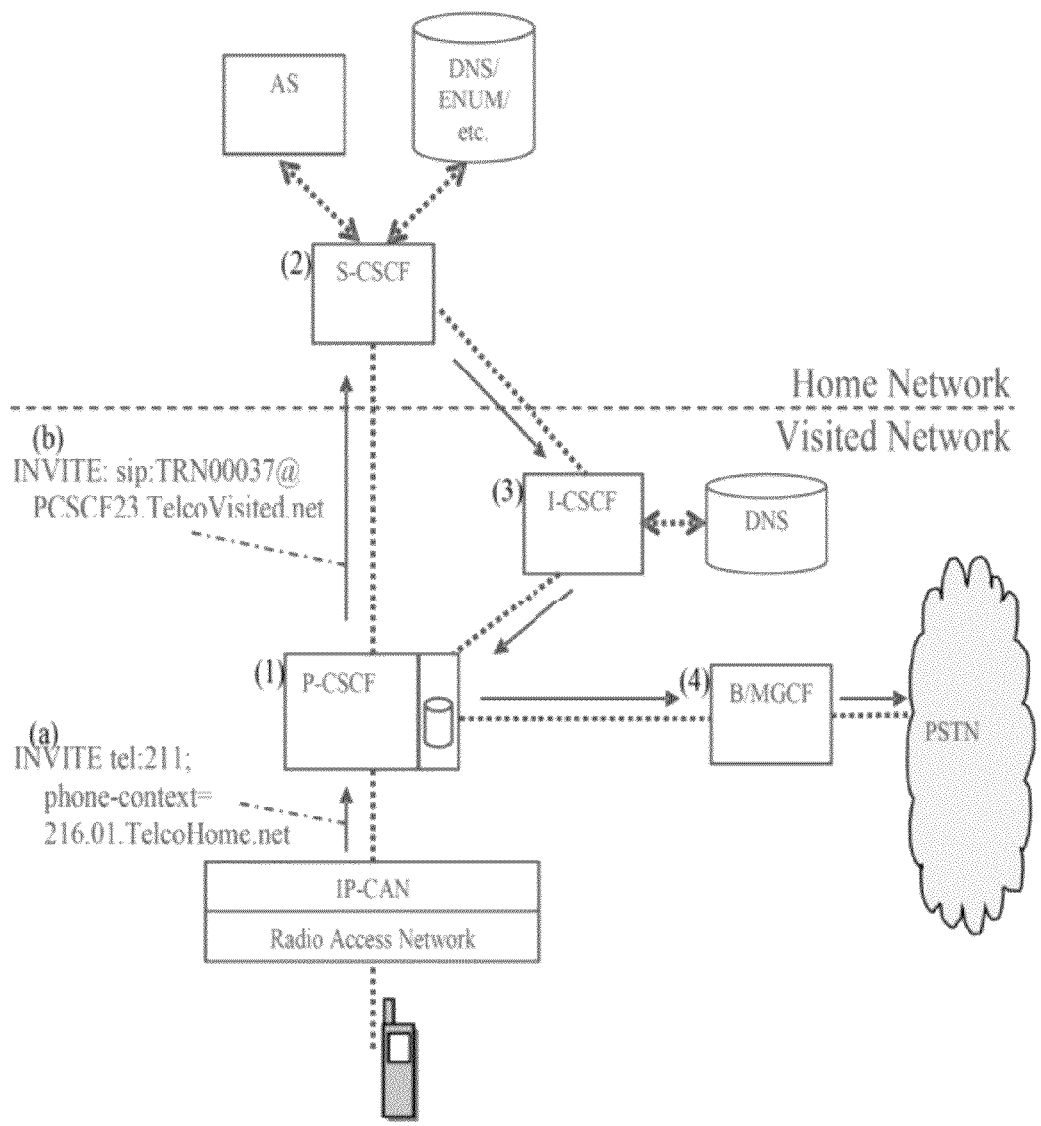

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP is primarily used as examples for explanation purposes. However, the scope of this disclosure is not limited to the set of 3GPP. The disclosed subject matter is applicable to any networks and systems capable of wireless connection services. These include (but are not limited to) WiFi, WiMax, WCDMA, and so on.

As noted in the background section, a problem with the conventional IMS is that the services and routing decisions are all handled in the user's home network. Thus, when the user roams to another geographic area, the user's home network typically will not understand how to properly route calls made to geo-local numbers in the visited network.

In an aspect of the disclosed subject matter, a process is performed by an IMS component in a user's visited location when it detects a geo-local number has been dialed from a visiting user terminal. An example of such component is a P-CSCF (Proxy-Call Session Control Function). The method involves modifications to the R-URI (Request-Uniform Resource Identifier) in the initial SIP (Session Initiation Protocol) Invite. The incoming R-URI contains information describing the digits dialed by the user. The modified R-URI allows the subsequent network components, some of which may be in another carrier's network, to deliver the request to an appropriate routing resolution server back in the visited network.

With the method, no modifications are necessary to other existing network components. This allows the other network components to use standards compliant IMS procedures. The routing resolution server in the visited network will understand the modified R-URI in the message and the meaning of the original geo-local number for the location of the visiting user, and thus be able to properly handle the routing of the call to the desired destination.

In one or more aspects, one of the principle advantages is that neither the UA (User Agent) (e.g., the cell phone of the roaming user) nor the user's home network is assumed to have knowledge of either context or meaning of any geo-local number dialed within the visited network. The UA, to the extent possible, provides information it has discovered about the local network to which it is attached. For example, the UA can provide the network code, the radio access type, cell cite, and so on. The UA is not expected to provide any context or assessment related to how to interpret or route the dialed number.

While the examples use geo-local numbers for illustrations, the scope of the disclosure is not so limited. That is, the discussion is applicable to many types of geo-local addressing schemes. Regarding geo-local numbers, it may be useful to provide a brief overview. The addresses used in R-URIs may be specified in either SIP or TEL format. SIP also allows an embedded TEL format, as shown below. Also, while cell phones (or simply phones) are likewise used for explanations, the scope of the disclosure encompasses any type of UAs.

Global Addresses:

These addresses uniquely identify the user that the message is destined for. The following are merely examples and are not intended to be exhaustive.

tel:+19725551212 sip:+19725551212; user=phone (an embedded TEL format)

sip:username17@telcohome.net

Home-local Addresses:

This format is not globally relevant necessarily. These addresses are meaningful only in the home network of the user in most instances. The user's home network will interpret them in a context appropriate for that user. Again, these are examples and are not necessarily exhaustive.

tel:54321; phone-context=TelcoHome.net sip:54321; phone-context=TelcoHome.net;user=phone Geo-local Addresses:

This format is not necessarily globally relevant. These addresses are typically meaningful only in a particular network, or even in a part of a network such as the user's visited network.

If access technology info is available:

tel:211; phone-context=261.01. eps.TelcoHome.net sip:211; phone-context=261.01. eps.TelcoHome.net; user=phone If no access technology info is available:

tel:211; phone-context=geo-local.TelcoHome.net sip:211; phone-context=geo-local.TelcoHome.net; user=phone In the geo-local examples above, the format components can represent the following:

- The digit sequence "261.01" represents information obtained by the phone about the access network to which it is attached:
- 261 is a representative Mobile Country Code, and
- 01 is a representative Mobile Network Code.
- The "eps" represents the packet access technology, in this case the Enhanced Packet System.
- The "TelcoHome.net" component is the Home network of the user.

Note that in the geo-local number examples, the term representing the Home network of the user is prefixed either by specific access technology information or by the generic "geo-local" tag if such access info is not available. Neither of these components precedes the home network name in a home-local address.

An IMS network is typically configured such that when a UA (e.g. the user's terminal) attaches to the radio access network and registers with IMS, the UA is assigned a P-CSCF. This P-CSCF is generally local to the user's current location. When the user is located within his or her home network, the assigned P-CSCF will likely be also part of the home network. But when the user is roaming on another network, or is visiting a different region of his or her own network, the UA will be assigned a local P-CSCF that is owned/operated by the network or portion of the network the user is currently visiting.

In the scenarios described below, it is assumed that the user is in a visited network where the local dialing plan has characteristics different than his Home network.

Figure 2:
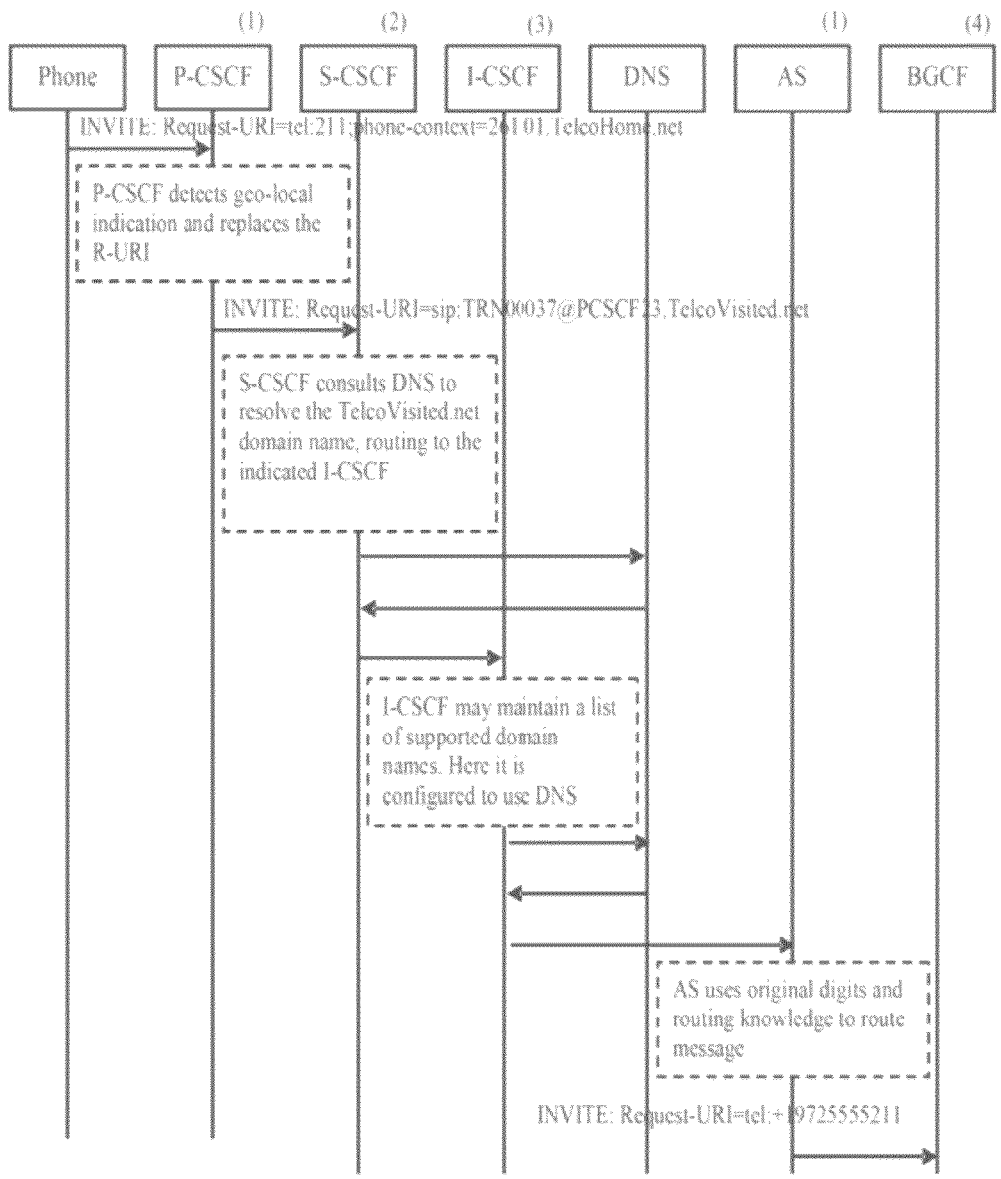
FIG. 2 illustrates a signaling diagram for geo-local routing related to the scenario in FIG. 1.

The first scenario is described in conjunction with FIGS. 1 and 2. In this scenario, the sequence is as follows: The P-CSCF (1) detects that a geo-local R-URI (a) "tel:211; phone-context=261.01.TelcoHome.net" has been entered by the user. The P-CSCF (1) creates a new R-URI (b) "sip:TRN00037@PCSCF23. TelcoVisited.net" that includes a user portion and a host portion. The user portion, which in this example is the portion to the left of and including the @ symbol, i.e. "sip:TRN00037@", is designed to be unique for this P-CSCF. The host portion of the new R-URI is a value that includes a domain component "TelcoVisited.net." identifying this visited network and a subdomain component "PCSCF23" representing the particular P-CSCF that created the R-URI. The newly created R-URI (b) is forwarded to the user's home network.

When received in the home network, the S-CSCF (serving-CSCF) (2) can use DNS to route this request, based on the domain name in the R-URI, to the defined I-CSCF (interrogating-CSCF) (3) for that domain. Note that since the two network operators must have had a roaming agreement in place to allow the user to obtain service in the visited network, it is reasonable to assume that the Home network will find a DNS entry for the visited network.

When received by the I-CSCF (3) in the visited network, it uses either configuration data or a local DNS lookup to resolve the subdomain and identify the IP address of the P-CSCF (1) that originally handled the message. In this case, the P-CSCF (1) also supports an AS (Application Server) function. For the remainder of this document, no distinction will be made between the P-CSCF and the AS function resident at the P-CSCF.

Upon receiving the incoming message, the P-CSCF (1) can examine the user portion of the R-URI (b) and use this to identify any cached information about the originally dialed geo-local number. It may also use information saved in headers such as the P-Called-Party-ID and/or History-Info headers of the message. Based on its knowledge of geo-local numbers in the Visited network, it resolves the geo-local number to a suitable destination address (e.g. a local land-line telephone number). It creates a modified message and routes the message toward the appropriate IMS network entity using normal message handling procedures. For a land-line destination this might be a BGCF (Breakout Gateway Controlling Function) or MGCF (Media Gateway Controlling Function) (4).

Figure 3:
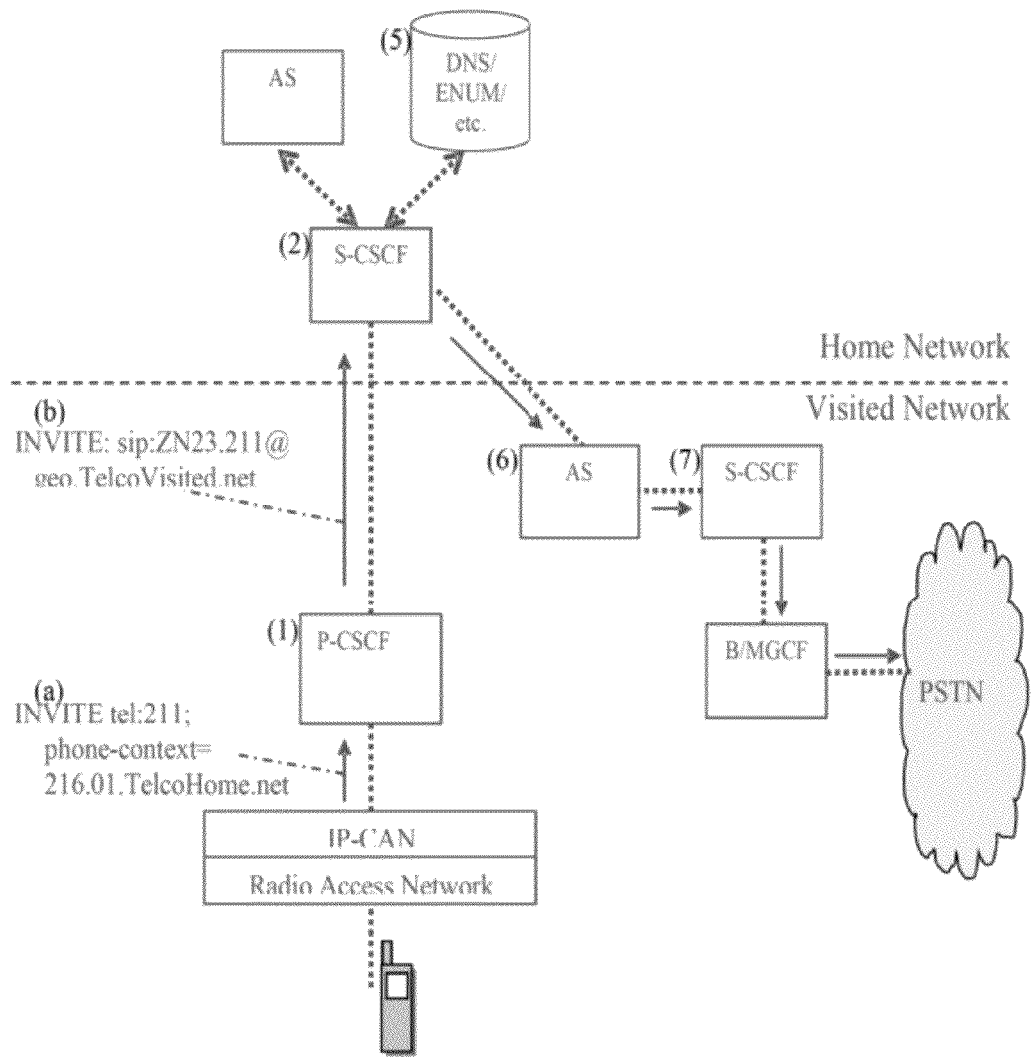
FIG. 3 illustrates another example scenario for geo-local routing for providing geo-local service to a visiting mobile terminal.
Figure 4:
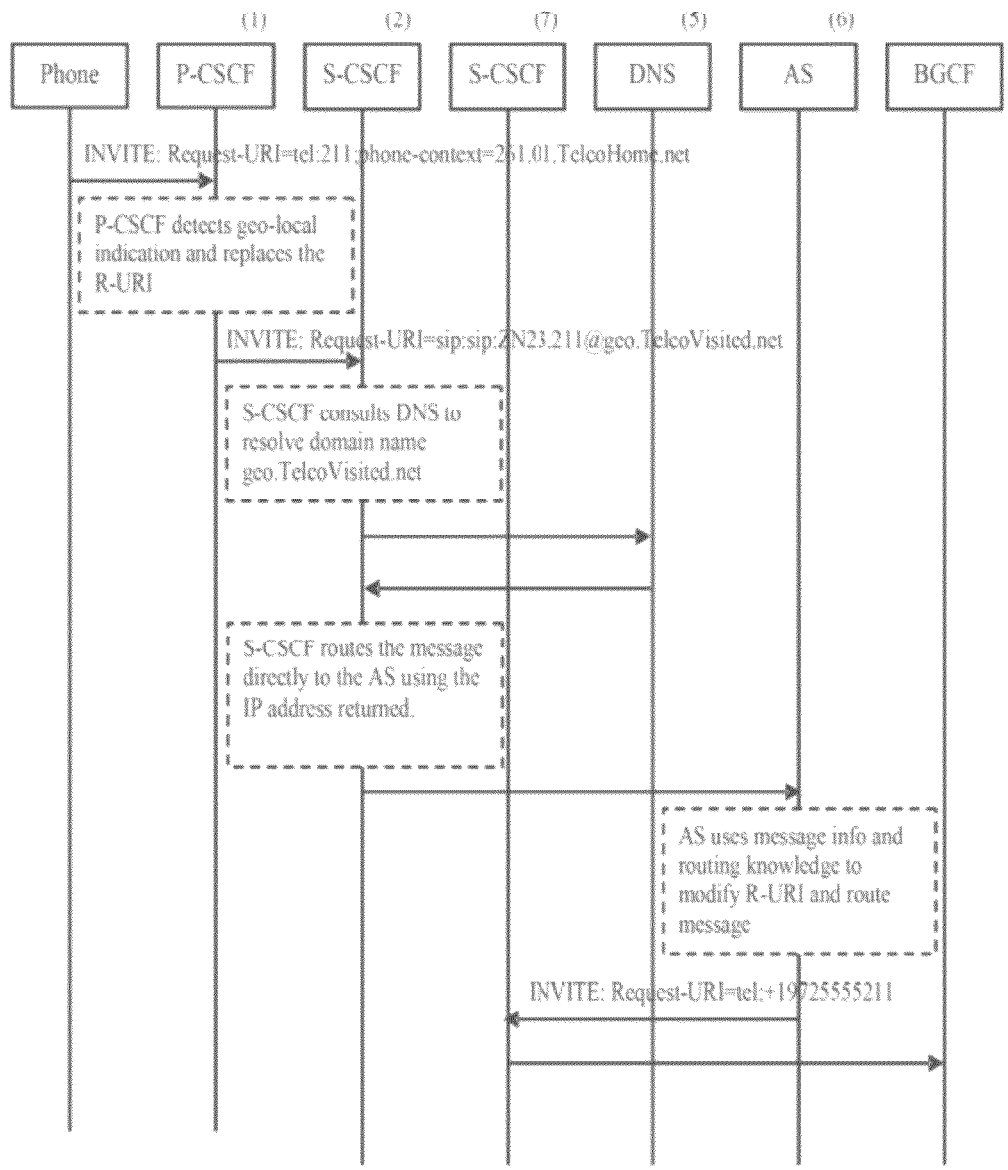
FIG. 4 illustrates a signaling diagram for geo-local routing related to the scenario in FIG. 3.

The second scenario is described in conjunction with FIGS. 3 and 4. In this scenario, the sequence is as follows: The P-CSCF (1) detects that a geo-local R-URI (a) "tel:211; phone-context=261.01. TelcoHome.net" has been entered by the user. This is similar to the first scenario described above. Also like the first scenario, the P-CSCF (1) generates a new R-URI (b), but the form of the newly generated R-URI (b) is different.

In this scenario, the P-CSCF (1) generates an R-URI (b) "sip:ZN23.211@geo.TelcoVisited.net". The user portion "sip:ZN23.211@" includes an identifier "ZN23" for the geographical zone that the P-CSCF (1) serves. The user portion can also include a replica of the particular geo-local number "211" entered by the user. This inclusion can provide protection against any intermediate nodes that modifies or drops the SIP headers that would normally carry this information.

The host portion of the new R-URI contains a globally relevant identifier "geo" for the geo-local Application Server (6) in the visited network. The newly created R-URI (b) is forwarded to the user's home network.

When the R-URI (b) is received in the home network, the S-CSCF (3) can use a global DNS server (5) to resolve the R-URI (b). In one aspect, the subdomain level of the visited network can be defined in the global DNS server (5). This allows the S-CSCF (3) to route the message directly to the AS (6) that handles geo-local address resolution in the visited network. Alternatively, if the visited network's operator does not wish to expose the address of this AS (6) globally, the operator may populate the DNS with the address of an I-CSCF in the visited network which will subsequently resolve the subdomain to the correct AS (6).

Once the message is received by the AS (6), it uses the information in the R-URI (b) and the message body to resolve the geo-local address. In this case, the user portion of the address includes an indicator of the geographic zone served by the P-CSCF (1). This allows the AS (6) to know the proper context for the geo-local number. In addition, the P-CSCF (1)

could have encoded any other information it deemed relevant for proper operation of the AS (6).

Based on its knowledge of geo-local numbers in the visited network, the AS (6) resolves the geo-local number to a suitable destination address, e.g. a local land-line telephone number. The AS (6) modifies the message appropriately and directs it towards an appropriate S-CSCF (7) in the visited network. Normal IMS message handling procedures can be used for final delivery.

Figure 5:
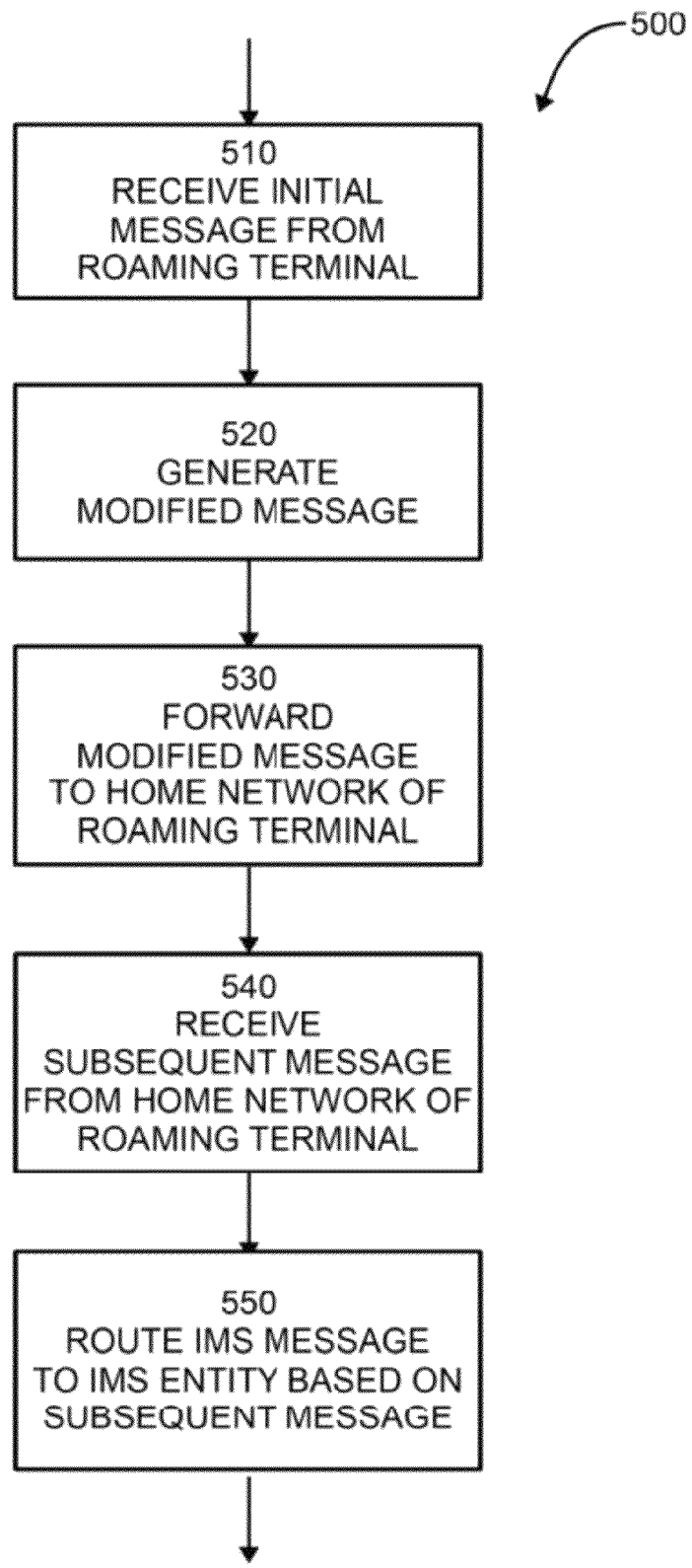
FIG. 5 illustrates a flow chart of an example method for routing an IMS message for a geo-local service request.

FIG. 5 illustrates a flow chart of an example method for routing an IMS message for a geo-local service request made by a roaming UA such as a user equipment or other types of mobile terminals. The method illustrated in FIG. 5 corresponds to the first scenario described in conjunction with FIGS. 1 and 2. Recall from above that when a UA is roaming, i.e. is visiting another network, the roaming UA is assigned a proxy server of the visited network. For clarity, designations "home" and "visited" are in relation to the UA making the geo-local service request while roaming outside of its home network. When the roaming UA makes the service request, the request is sent to the assigned proxy server. The method 500 of FIG. 5 may be performed by the proxy server of the network the roaming UA is currently visiting.

In the method 500, the proxy server, e.g., P-CSCF, of the visited network receives an initial message from the roaming UA in step 510. The initial message is assumed to be a geo-local service request message that is meaningful within the visited network. For example, *377 is meaningful in a network that includes Texas for highway emergency assistance. It should be noted that the requirement of the initial message being meaningful within the visited network is independent of whether or not the same message is meaningful in any other network.

In step 520, the proxy server generates a modified message based on the initial message. In this instance, the modified message is a SIP message, and includes information apart from information included in the initial message. The modified message includes information to enable the home network of the UA to route a subsequent message, which is related to the modified message, to the visited network.

Figure 6:
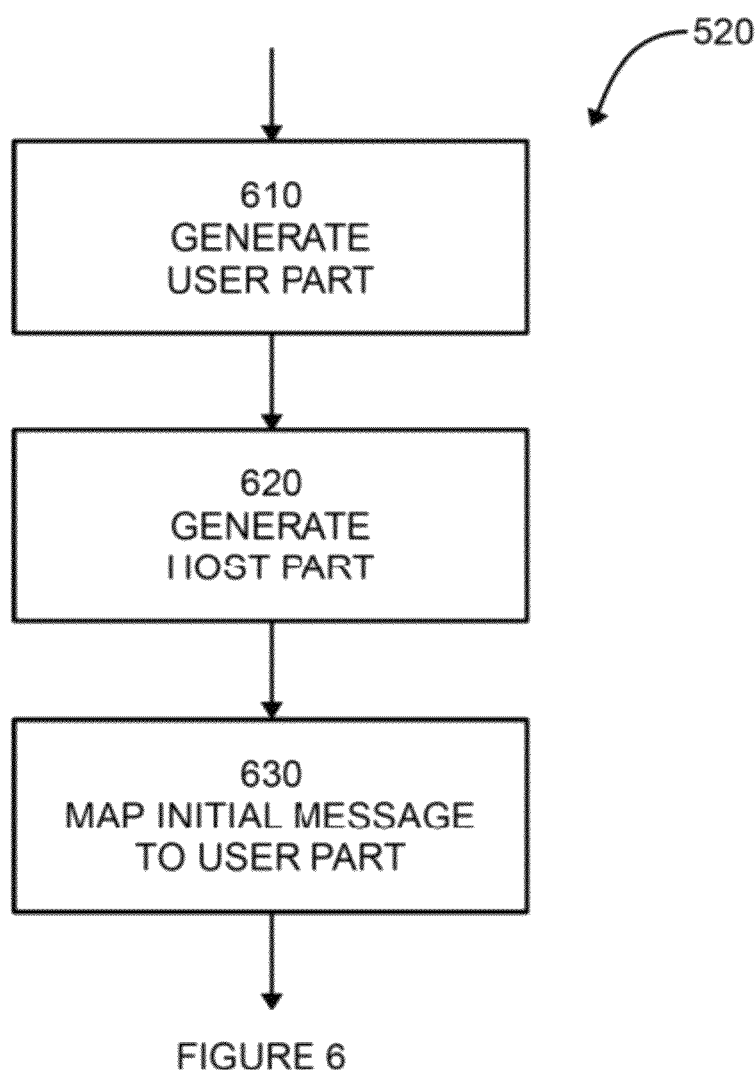
FIG. 6 illustrates a flow chart of an example process for generating a modified message.

FIG. 6 illustrates a flow chart of an example process for performing step 520 of generating the modified message based on the initial message. As seen, the proxy server generates a user part of the modified message in step 610, generates a host part in step 620, and maps the initial message from the roaming UA to the user part. These steps are explained in further detail as follows.

In the example scenario described above in relation to FIGS. 1 and 2, the geo-local R-URI "tel:211; phone-context=261.01. TelcoHome.net" entered by a user is an example of the initial message. Upon receipt of the geo-local R-URI, the P-CSCF, which is an example of a proxy server, creates a R-URI "sip:TRN00037@PCSCF23. TelcoVisited.net", which is an example of the modified message. The newly created R-URI includes a user part "sip:TRN00037@" and a host part "PCSCF23. TelcoVisited.net" corresponding to steps 610 and 620. The host part can be further subdivided into a domain component "TelcoVisited.net" that identifies the visited network and a subdomain component "PCSCF23" that identifies the proxy server.

A relationship between the initial message and the modified message may be as follows. Each roaming UA is uniquely identifiable within the visited network. Thus, the proxy server is aware of which UA sent the initial message. In one embodiment, the proxy server can cache, i.e. locally store, the initial message. The cached initial message can then be mapped to the user part to establish the relationship between the initial and service request messages. The user part generated in step 610 is assumed to be unique within the proxy server. Thus, in the example scenario described above, the server PCSCF23 can locally store the geo-local R-URI "tel:211; phone-context=261.01. TelcoHome.net" received from the roaming UA which can be mapped to "TRN00037" corresponding to step 630.

Referring back to FIG. 5, the proxy server forwards the modified message to the home network of the roaming UA in step 530. It is important to note the following. The modified message—generated in step 520 and forwarded in step 530—conforms to the standard IMS messaging protocol. Thus, the no particular modifications are required in the entities of the home network of the roaming UA to process the modified message.

In step 540, the proxy server receives the subsequent message from the home network of the roaming UA. Like the modified message, the subsequent message is also a SIP message. As noted, the modified and the subsequent messages are related to each other.

If the roaming UA's home network's DNS (domain name server) has knowledge of the particular subdomain in the host part of the modified message (e.g. "PCSCF23"), the home network can directly route the subsequent message to the proxy server. Otherwise, the home network can route the subsequent message to a redirect server of the visited network, and the redirect server would then forward the subsequent message to the proxy server. 3GPP's I-CSCF is an example of the redirect server.

In step 550, based on the subsequent message, the proxy server routes an IMS message related to the initial message to an IMS entity of the visited network. For example, if the initial message from the roaming UA is a request for highway emergency assistance, the proxy server can route an appropriate IMS message to a server of the state police.

Figure 7:
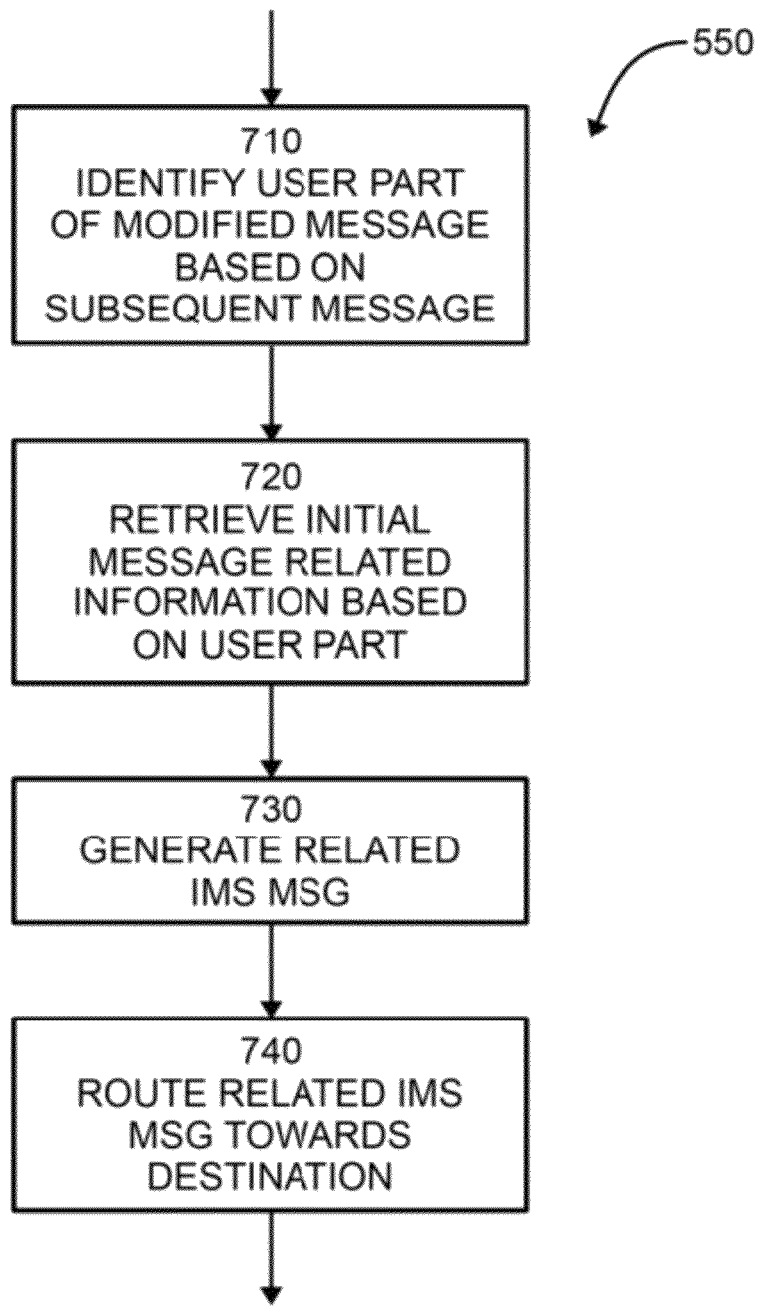
FIG. 7 illustrates a flow chart of an example process for routing an IMS message to an IMS entity.

FIG. 7 illustrates a flow chart of an example process for performing step 550. In one embodiment, the modified and the subsequent message are related in that the subsequent message includes sufficient information to extract or otherwise identify the user part of the modified message generated by the proxy server.

In step 710, the proxy server identifies the user part of the modified message based on the subsequent message received from the roaming UA's home network. In one aspect, the subsequent message may simply include the user part.

In step 720, the proxy server retrieves the information related to the initial message based on the identified user part. Recall that in the above described first example scenario, as part of generating the modified message in step 520, the proxy server caches the initial message received from the roaming UA in the local storage and maps the initial message to the user part. Thus, in one example implementation of step 720, the proxy server can use the user part identified in step 710 to retrieve any cached information about the initial message. Since the user part is unique within the proxy server, the retrieval of information related to the initial message is relatively simple and straight forward. The proxy server may also use information in headers such as the called-party identification or history information headers of the message. In one embodiment, the retrieved information is the initial message itself that was locally stored.

In step 730, based on the retrieved information related to the initial message, the proxy server generates an IMS message related to the retrieved information. In one example implementation of step 730, the proxy server has knowledge of geo-local numbers in the visited network related to the particulars of the service requested in the initial message. In this instance, the proxy server can resolve the geo-local number to a suitable destination address (e.g. a local land-line telephone number). That is, the proxy server can identify the appropriate IMS entity based on its (proxy server's) location and on the type of geo-local service, e.g. auto repair, list of local restaurants, highway emergency assistance request, etc., requested in the initial message, and generate the IMS message directed to the resolved destination address.

In step 740, the proxy server routes the generated IMS message to the appropriate IMS entity of the visited network. For a land-line destination this might be a breakout gateway controller or a media gateway controller. Examples of these controllers are 3GPP's BGCF (Breakout Gateway Controlling Function) and MGCF (Media Gateway Controlling Function).

Referring back to FIG. 5, the method 500 may be generalized as follows. When the proxy server of a visited network receives a geo-local service request from a roaming UA, the proxy server generates a modified request and forwards the modified request to the home network of the UA. The modification is such that the UA's home network sends back to the proxy server of the visited network a subsequent request related to the modified request. The proxy server then sends an IMS message to an appropriate IMS entity in the visited network to satisfy the original geo-local service request from the roaming UA. This corresponds to the scenario illustrated in FIGS. 1 and 2.

Figure 8:
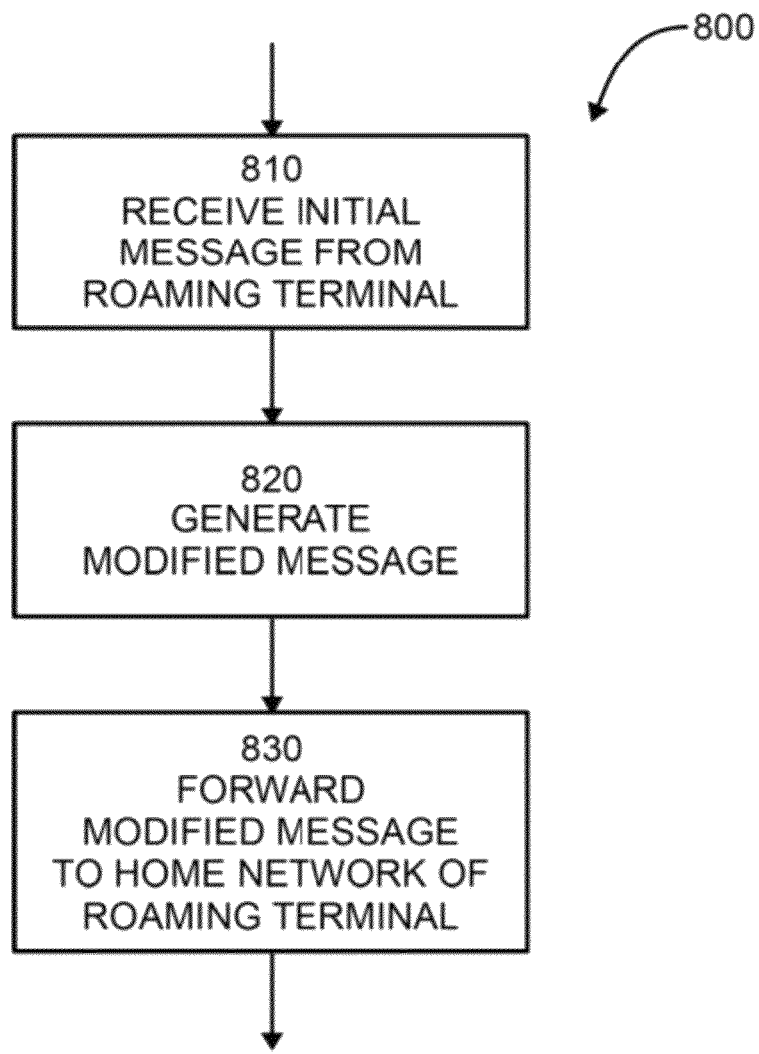
FIG. 8 illustrates a flow chart of another example method for routing an IMS message for a geo-local service request.

But in the alternative scenario illustrated in FIGS. 3 and 4, the subsequent request from the roaming UA's home network need not be directed back to the proxy server that generates and forwards the modified request. Instead, the home network may direct the subsequent request towards the AS, i.e. the appropriate IMS entity of the visited network. FIG. 8 illustrates a flow chart of an example of this alternate method for routing an IMS message for a geo-local service request.

In method 800, the proxy server of the visited network receives an initial message from the roaming UA in step 810. The initial message is assumed to be a geo-local service request message that is meaningful within the visited network.

In step 820, the proxy server generates a modified message based on the initial message. The modified message is a SIP message, and includes information apart from information included in the initial message. The modified message includes information to enable the home network of the UA to route a subsequent message, which is related to the modified message, to an AS of the visited network. Step 820 will be further described below In step 830, the proxy server forwards the modified message from the proxy server to the home network of the roaming UA. As illustrated in FIGS. 3 and 4, the home network receives the modified message, generates a related subsequent message, and routes the subsequent message to an appropriate IMS entity in the visited network instead of routing to the proxy server.

Figure 9:
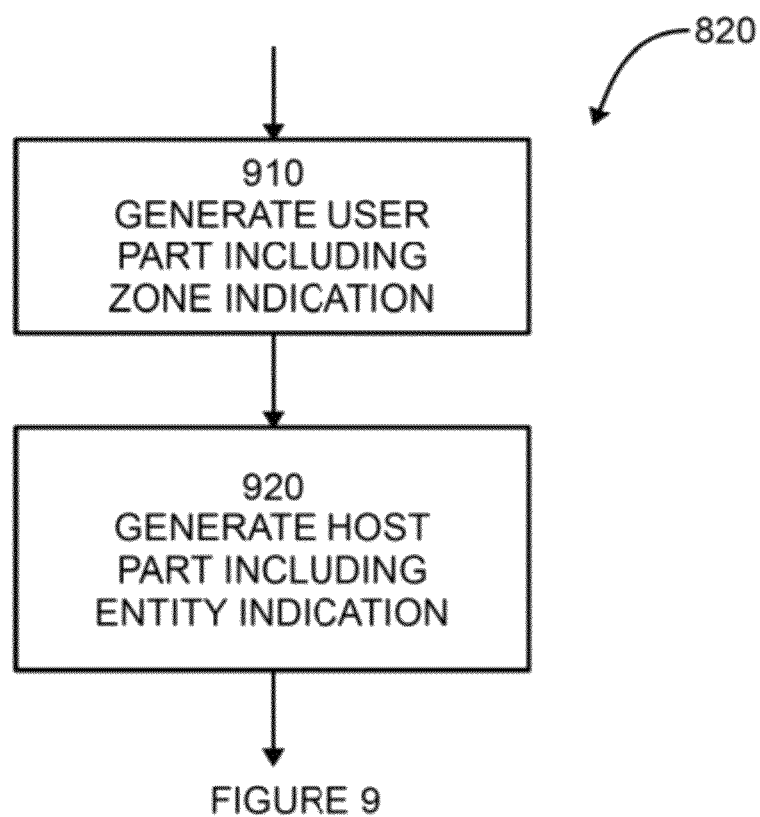
FIG. 9 illustrates a flow chart of another example process for generating a modified message.

FIG. 9 illustrates a flow chart of an example process for performing step 820 of generating the modified message based on the initial message. Recall that in the second example scenario described above in conjunction with FIGS. 3 and 4, based on the initial message in the form of a geo-local URI "tel:211; phone-context=261.01. TelcoHome.net" received from the roaming UA, the proxy server can generate the modified message "sip:ZN23.211@geo.TelcoVisited.net" that includes user and host parts.

In step 910, the proxy server generates the user part of the modified message. The user info part in the second scenario includes a zone indication of a geographical zone served by the proxy server. In the example above, "ZN23" is the zone indication of the proxy server.

Note that the user part also includes "211" which is a replica of the geo-local number dialed by the user. It should be noted this is not a requirement. However, inclusion of the user dialed geo-local number in the user part can provide protection against any intermediate nodes that either modifies or drops the SIP headers that would normally carry this information. Note that exact replica of the dialed number need not be provided. It is enough if the information is sufficient to determine the geo-local number entered by the user or an equivalence thereof. For example, if the user enters "411", the user part may include "DirectoryAssistance".

In step 920, the proxy server generates the host part of the modified message such as "geo.Telcovisited.net" in the above example. Preferably, the host part includes an entity indication of an IMS entity, i.e. an application server, of the visited network. In one embodiment, entity indication may be resolvable at the home network of the roaming UA. This enables the home network to route the related subsequent message, which is a SIP message, to the appropriate IMS entity of the visited network.

The entity indication is generated based on the location of the proxy server. If the IMS entity can handle all types of geo-local requests, the proxy server's location may be sufficient. On the other hand, there may be multiple IMS entities available in the visited network and some may be better suited than others to handle the particular type of service requested in the initial message. In this instance, the entity indication can be generated based also on the type of the geo-local service requested. The IMS entity should be capable of resolving the geo-local address of the initial request.

Referring back to FIG. 8, it is described that after the proxy server forwards the modified message to the home network of the roaming UA in step 830, the home network can directly route the subsequent message directly towards the IMS entity in the visited network instead. This indicates that the IMS entity—the application server—is resolvable at the home network.

However, the operator of the visited may not want the visited network entities to be exposed to other networks in general or to the home network in particular. To prevent such exposure, in an alternative implementation of step 920, the proxy server can generate the host part to include a subdomain part that identifies the appropriate IMS entity, but which is also not resolvable at the home network. The home network directs the subsequent message to the redirect server of the visited network which can fully resolve the subdomain part to direct the subsequent message to the IMS entity. The subdomain part may be based on the type of geo-local service requested in the initial message and the location of the proxy server.

If there is a plurality of redirect servers of the visited network, it is preferred that the subsequent message from the home network be directed to the redirect server that corresponds to the zone of the proxy server. Thus, the proxy server may generate the host part based on the geographical zone served by the proxy server.

Figure 10:
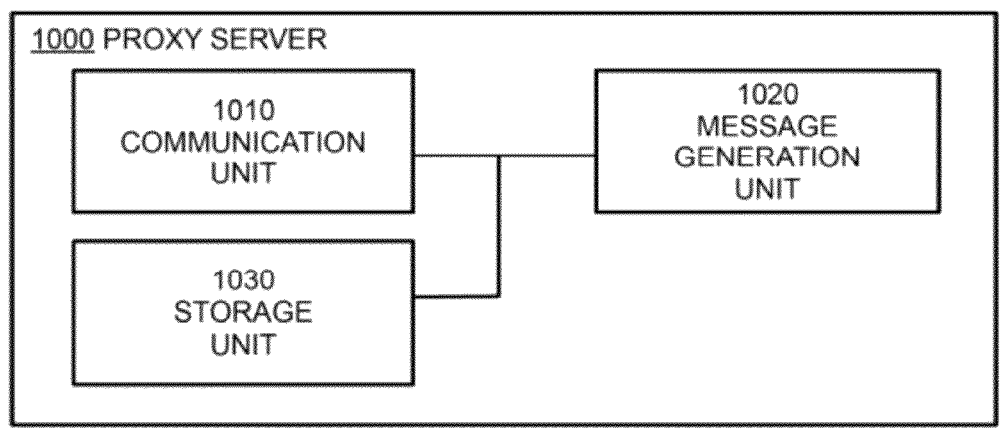
FIG. 10 illustrates a block diagram of an example embodiment of a proxy server arranged to route an IMS message for a geo-local service request.

FIG. 10 illustrates an example arrangement of a proxy server. An example of the proxy server is the proxy-call session control function (P-CSCF). As seen, the proxy server 1000 may include a communication unit 1010, a message generation unit 1020, and a storage unit 1030. FIG. 10 provides a logical view of the proxy server 1000, and thus, some or all units may be separate or may be combined physically. Also, the some or all units may be implemented through a combination of hardware and software. The proxy server 1000 may include one or more processing units executing program instructions stored in the storage unit 1030 to perform the functions of the units. The program instructions may be provided through a non-transitory storage medium, programmed in firmware, or provided through any distribution means including electronically downloading from a server. The roles performed by the different units of the proxy server 1000 correspond to the methods and processes described above, and thus will not be repeated here.

Note that the above-described embodiments and methods demonstrate useful characteristics. For example, there exists an option to use R-URI that allows Global DNS resolution or one that requires local DNS resolution. As another example, there is also an option to use an AS embedded in the proxy server, or a standalone AS function.

Regardless, if the proxy server does not recognize a R-URI that has been constructed by the phone in geo-local format, this means the number has no known geo-local interpretation. The proxy server will leave the R-URI unmodified to be handled by the home network.

Note that standards allow for a phone to be configured with information to recognize dialing patterns relevant within the user's home network such as a business' PBX dial plan. These may be referred to as the "home-Local" numbers described earlier. If the user was to dial one of these recognized patterns, the phone may create a R-URI without the geo-local indication. As per the existing 3GPP standard, in these cases the UA "shall include in the "phone-context" tel URI parameter the home domain name". The home domain name is sufficient information such that the P-CSCF would not alter the R-URI and it would be left (correctly) for handling by the user's home network.

When modifying the R-URI, it is preferred that the proxy server include any appropriate new or updated headers in the rest of the SIP messages. These other headers have been omitted here for clarity. For example, the History-Info header (RFC4244) and the P-Called-Party-ID may be added.

The described embodiments and method show examples of suitable R-URIs. However, the disclosed subject matter is applicable to cover any number of similar suitable formats that meet the requirements of being able to be routed back to the visited network using existing IMS routing procedures and to be associated with the proxy server that created it.

The disclosed subject matter could be proposed to standards bodies such as 3GPP for inclusion as optional procedures to be executed at the P-CSCF. The P-CSCF has already been assigned procedures for monitoring the R-URI for pre-configured Emergency Access codes such as 911, and redirecting the session to an E-CSCF (Emergency-CSCF) in such cases. Monitoring for a geo-local format R-URI and the configuration of local access strings or codes could be an extension of this concept. This would have the benefit of providing an industry standard method of addressing this issue. Collocation of the described AS function with the proxy server can be a vendor or carrier decision.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method for routing an IP Multimedia Services (IMS) service request message, the method comprising:
   receiving, at a proxy server of a visited network, an initial message from a roaming user agent, the initial message being a geo-local service request message that is meaningful within the visited network;
   generating, at the proxy server, a modified message based on the initial message, the modified message being a session initiation protocol (SIP) message;
   forwarding the modified message from the proxy server to a home network of the roaming user agent;
   receiving, at the proxy server, a subsequent message from the home network of the roaming user agent, the subsequent message being a SIP message and including information for resolving a destination address corresponding to the geo-local service request message; and
   routing an IMS message related to the initial message to an IMS entity of the visited network based on the subsequent message,
   the modified message including:
      information apart from information included in the initial message; and information to enable the home network of the user agent to route the subsequent message to the visited network.

2. The method of claim 1, wherein the generating the modified message based on the initial message comprises:
   generating a user part of the modified message, the user part being usable to retrieve information related to the initial service request; and
   generating a host part of the modified message to include a domain component identifying the visited network and a subdomain component identifying the proxy server.

3. The method of claim 2, wherein the routing the initial message to the appropriate entity of the visited network based on the subsequent message comprises:
   identifying the user part based on the subsequent message;
   retrieving the information related to the initial message based on the identified user part;
   generating the IMS message based on the retrieved information related to the initial message; and
   routing the generated IMS message to the appropriate IMS entity of the visited network.

4. The method of claim 3, wherein in generating the IMS message based on the retrieved information related to the initial message, the IMS entity is identified based on a type of geo-local service requested in the initial message and a location of the proxy server.

5. The method of claim 3, wherein the IMS entity includes one of a breakout gateway controller and a media gateway controller.

6. A proxy server of a visited network arranged to route an IP Multimedia Services (IMS) service request message, the proxy server comprising:
   a communication unit configured to receive an initial message from a roaming user agent, the initial message being a geo-local service request message that is meaningful within the visited network; and
   a message generation unit configured to generate a modified message based on the initial message, the modified message being a session initiation protocol (SIP) message,
   the communication unit being further configured to:

forward the modified message to a home network of the roaming user agent,
receive a subsequent message from the home network of the roaming user agent, the subsequent message being a SIP message and including information for resolving a destination address corresponding to the geo-local service request message, and
route an IMS message related to the initial message to an IMS entity of the visited network,
the message generation unit being further configured to generate the IMS message related to the initial message to be directed to the IMS entity based on the subsequent message,
the modified message including information apart from information included in the initial message and information to enable the home network of the user agent to route the subsequent message to the visited network.

7. The proxy server of claim 6, wherein the message generation unit to generate the modified message is further configured to:
generate a user part of the modified message, the user part being usable to retrieve information related to the initial service request; and
generate a host part of the modified message to include a domain component identifying the visited network and a subdomain component identifying the proxy server.

8. The proxy server of claim 7, wherein the message generation unit is further configured to:
identify the user part based on the subsequent message,
retrieve the information related to the initial message based on the identified user part, and
generate the IMS message based on the retrieved information related to the initial message, and
wherein the communication unit is further configured to route the generated IMS message to the IMS entity of the visited network.

9. The proxy server of claim 8, wherein the message generation unit is further configured to identify the IMS entity based on a type of geo-local service requested in the initial message and a location of the proxy server.

10. A method for routing an IP Multimedia Services (IMS) service request message, the method comprising:
receiving, at a proxy server of a visited network, an initial message from a roaming user agent, the initial message being a geo-local service request message that is meaningful within the visited network;
generating, at the proxy server, a modified message based on the initial message, the modified message being a session initiation protocol (SIP) message, generating the modified message based on the initial message including:
generating a user part of the modified message, the user part including a zone indication of a geographical zone served by the proxy server, and
generating a host part of the modified message, the host part including an entity indication of an entity of the visited network resolvable at a home network of the roaming user agent to enable the home network of the roaming user agent to route a subsequent message to the entity of the visited network, the subsequent message being a SIP message and being related to the modified message, the generated host part also including a subdomain part identifying an IMS entity fully resolvable by a redirect server of the visited network and not resolvable in the home network of the roaming user agent; and
forwarding the modified message from the proxy server to the home network of the roaming user agent.

11. The method of claim 10,
wherein the entity indication identifies an IMS entity of the visited network fully resolvable in the home network of the roaming user agent, and
wherein in generating the host part, the entity indication is generated based on a location of the proxy server.

12. The method of claim 11, wherein in generating the host part, the entity indication is generated also based on a type of geo-local service requested in the initial message.

13. The method of claim 11, wherein the IMS entity is configured to resolve a geo-local address of the initial message.

14. The method of claim 10,
wherein the entity indication identifies the redirect server of the visited network resolvable in the home network of the roaming user agent, and
wherein the subdomain part is generated based on a type of geo-local service requested in the initial message and a location of the proxy server.

15. The method of claim 14,
wherein the redirect server is one of a plurality of redirect servers of the visited network, and
wherein in generating the modified message based on the initial message, the host part is generated based on a geographical zone served by the proxy server.

16. The method of claim 10, wherein the modified message further comprises information sufficient to determine the geo-local number entered by a user of the roaming user agent.

17. A proxy server of a visited network arranged to route an IP Multimedia Services (IMS) service request message, the proxy server comprising:
a communication unit configured to receive an initial message from a roaming user agent, the initial message being a geo-local service request message that is meaningful within the visited network; and
a message generation unit configured to generate a modified message based on the initial message, the modified message being a session initiation protocol (SIP) message, the message generation unit being further configured to:
generate a user part of the modified message to include a zone indication of a geographical zone served by the proxy server, and
generate a host part of the modified message to include an entity indication of an entity of the visited network resolvable at the home network of the roaming user agent to enable the home network of the roaming user agent to route a subsequent message to the entity of the visited network, the subsequent message being a SIP message and being related to the modified message, the generated host part also including a subdomain part identifying an IMS entity fully resolvable by a redirect server of the visited network and not resolvable in the home network of the roaming user agent,
the communication unit further configured to forward the modified message to a home network of the roaming user agent.

18. The proxy server of claim 17,
wherein the entity indication identifies an IMS entity of the visited network fully resolvable in the home network of the roaming user agent, and
wherein the message generation unit is further configured to generate the entity indication based on a location of the proxy server.

19. The proxy server of claim 18, wherein message generation unit is further configured to generate the entity indication based on a type of geo-local service requested in the initial message.

20. The proxy server of claim 17,
wherein the entity indication is configured to identify the redirect server of the visited network resolvable in the home network of the roaming user agent, and
wherein the message generation unit is further configured to generate the subdomain part based on a location of the proxy server.

21. The proxy server of claim 20,
wherein the redirect server is one of plurality of redirect servers of the visited network, and
wherein the message generation unit is further configured to generate the host part based on a geographical zone served by the proxy server.

22. The proxy server of claim 17, wherein the modified message further comprises information sufficient to determine the geo-local number entered by a user of the roaming user agent.

* * * * *